United States Patent [19]

Layne et al.

[11] Patent Number: 5,070,999

[45] Date of Patent: Dec. 10, 1991

[54] HELICAL CONVEYOR/ACCUMULATOR

[75] Inventors: James L. Layne; Mark T. Johnson, both of Glasgow, Ky.

[73] Assignee: Span Tech Corporation, Glasgow, Ky.

[21] Appl. No.: 589,011

[22] Filed: Sep. 28, 1990

[51] Int. Cl.⁵ .............................................. B65G 13/02
[52] U.S. Cl. .................................. 198/778; 198/724; 198/853
[58] Field of Search ............... 198/724, 778, 852, 853; 62/381

[56] References Cited

U.S. PATENT DOCUMENTS

| | | | |
|---|---|---|---|
| 1,892,206 | 12/1932 | Dietz . | |
| 2,628,708 | 2/1953 | Wahl et al. | 198/724 |
| 3,071,240 | 1/1963 | Graham et al. . | |
| 3,261,453 | 7/1966 | Hirs . | |
| 4,560,086 | 12/1985 | Stol | 198/778 X |
| 4,756,403 | 7/1988 | Sasaki et al. . | |
| 4,953,693 | 9/1990 | Draebel | 198/853 |

Primary Examiner—Joseph E. Valenza
Assistant Examiner—Tuan N. Nguyen
Attorney, Agent, or Firm—King & Schickli

[57] ABSTRACT

A helical conveyor/accumulator includes a side flexing track wound in a helical pattern around a rotary drum. The drum includes longitudinal grooves that carry articles along the helically disposed track as the drum rotates. The grooves have article engaging ribs that cooperate to move the articles for feeding while allowing the article to be spaced from the ribs for accumulation. The side flexing track includes modular links coupled together by connecting rods. The track is supported around the drum by helical coils disposed at the inner edge and the outer edge of the track and support rods passing through the links and clamped to a frame. Articles are fed until stopped by a gate, and then when the gate is opened articles seat in successive grooves in the drum for metered or controlled discharge.

17 Claims, 3 Drawing Sheets

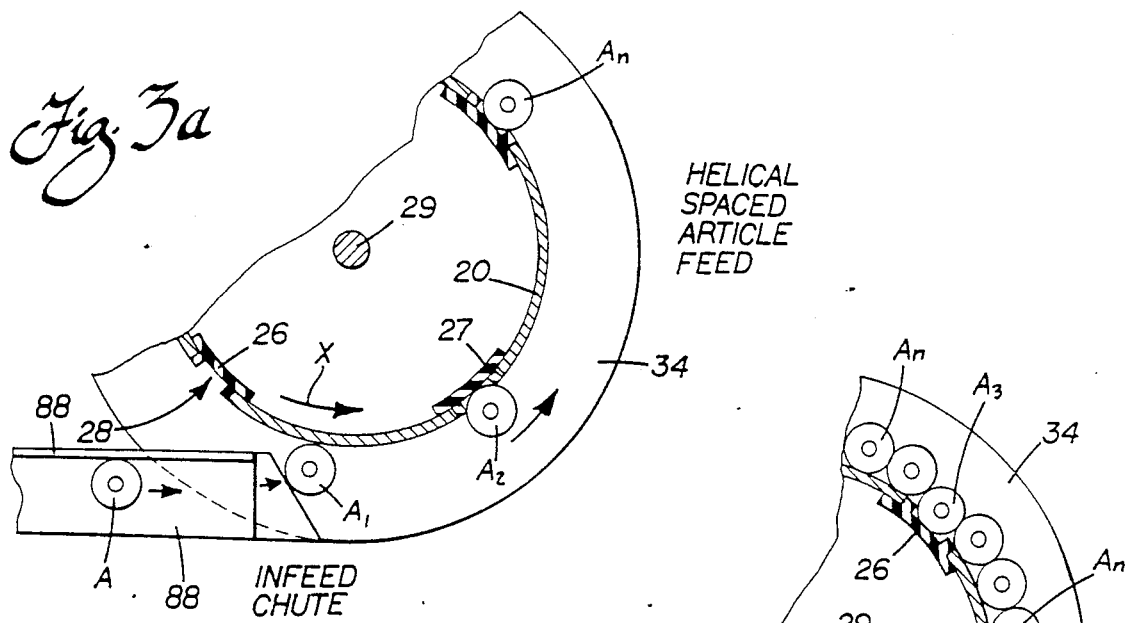
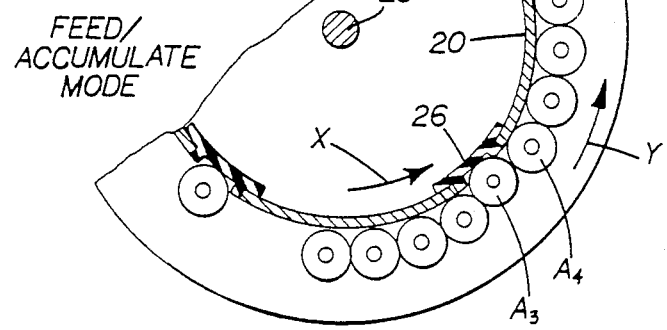
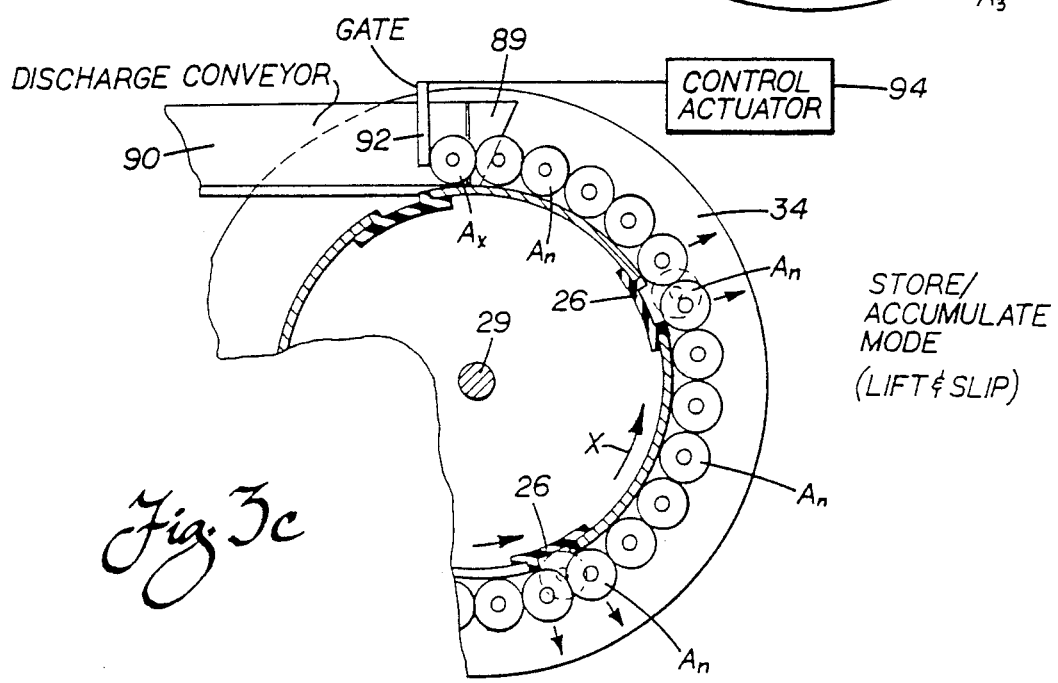

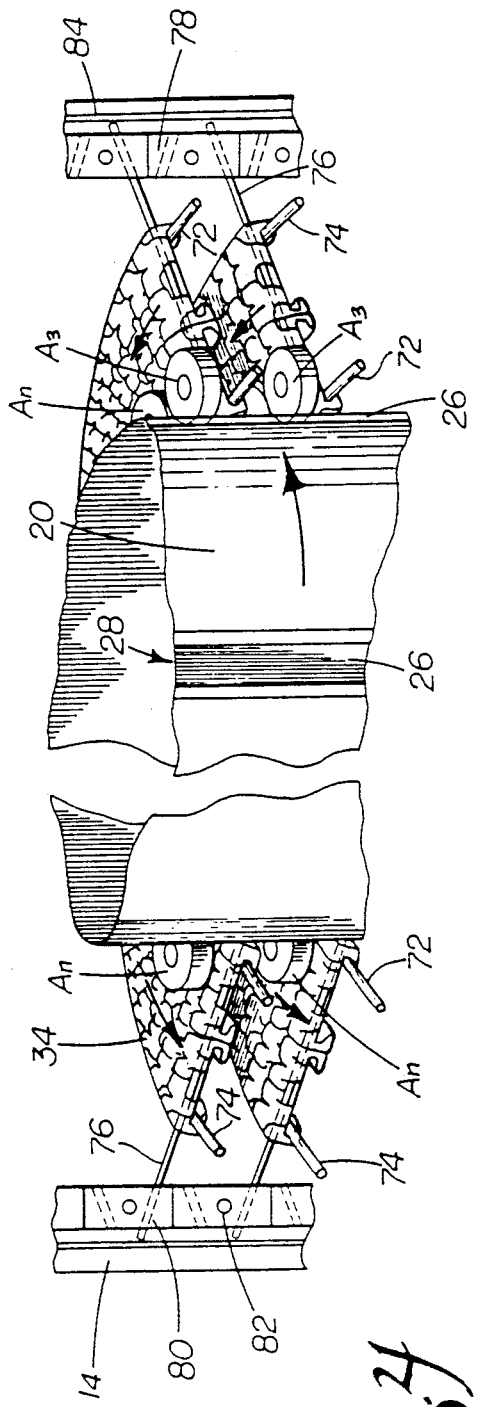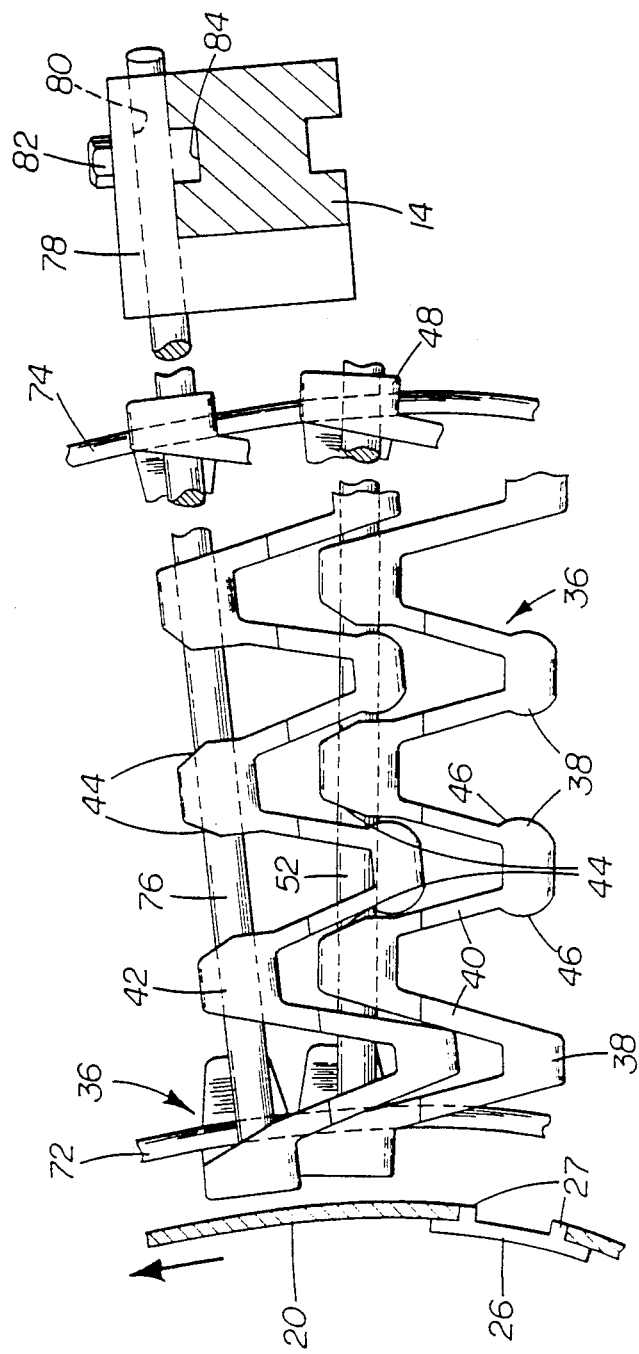
Fig. 4
Fig. 6

HELICAL CONVEYOR/ACCUMULATOR

TECHNICAL FIELD

The present invention relates generally to conveyors, and more particularly, to a helical conveyor/accumulator that is adapted to receive articles at random, convey and accumulate articles for temporary storage and release the articles in controlled succession.

BACKGROUND OF THE INVENTION

The efficient usage of space is extremely important in the ability to control operating costs in a manufacturing facility. Many engineers have realized the need to carefully consider the optimal positioning of working stations in a production line. The ability to place such stations in a product line in close proximity allows managers to efficiently use the remaining floor space for other important functions, or alternatively eliminate the need for the additional overhead expense associated with extra floor space.

Many manufacturing facilities also are established in buildings with multiple operating levels or floors. In these facilities, the processing line may require the transportation of work pieces or articles in progress between the different levels/floors. While inclined conveyors have long been used to accomplish this task, they inefficiently occupy floor space that may be needed for another purpose.

Helical conveyors have been designed to transport articles within a compact vertical space. An example of such a conveyor is disclosed in U.S. Pat. No. 1,892,206 to Dietz. A rotary element with concave article grooves for maintaining article separation is disposed within a stationary helical track. The grooves are adapted to receive articles (in this case cans or bottles) for vertical transport. As the element rotates, the can slides along the helical track and thus is either raised or lowered within the groove as the application dictates.

Each concave groove on the rotary element of the Dietz conveyor surrounds substantially one-half of the can or bottle that is engaged. Accordingly, it can be visualized that this conveyor design does not accommodate the accumulation of cans or bottles along the helical track. More particularly, if the cans or bottles are stopped for accumulation, jamming of the rotary element would immediately occur as the grooves could not temporarily disengage the cans or bottles.

The ability to accumulate articles along the track of a helical conveyor is very beneficial in many manufacturing facilities. Commonly, different work stations may be shut down from time to time for emergency repair and for maintenance. Absent the ability to accumulate articles as they exit upstream processing machines, the entire production line must be stopped. This can be very costly when many different processing machines are utilized in the entire production line.

Helical conveyors have been proposed to accomplish both functions; that is simultaneously vertically convey and store or accumulate a substantial number of the articles. In effect, these conveyor/accumulator assemblies provide the advantage of transporting articles between different elevations in a compact space and functioning essentially as a storage unit by accumulating the articles during vertical transfer. An example of such a helical conveyor/accumulator is disclosed in U.S. Pat. No. 3,261,453 to Hirs. A rotary drum is disposed within a metal helical track and an elongated brush (or brushes) is mounted on the drum. Thus, as the drum rotates, the brush pushes articles along the track and thus elevates (or lowers) and stores the articles, as desired.

It can be appreciated that over time the bristles on the brushes tend to fray or flatten, reducing their effectiveness and thus requiring periodic replacement. In addition, the bristles may hold and accumulate oil or debris, also reducing transporting efficiency. Further, the metallic nature of the track introduces the chance of the article being scratched or nicked. This is particularly undesirable when the conveyed articles are bearings or the like that have precise tolerances and exacting finishes.

Accordingly, there is a need to provide a device that can both vertically transport articles and, when conditions dictate the need, accumulate articles for temporary storage. Such a helical conveyor/accumulator would provide substantially frictionless surfaces for article contact to facilitate efficient conveyance and reduce the chances of article damage. As an additional advantage, upon release from accumulation, the helical conveyor/accumulator would allow a metered discharge. The conveyor/accumulator would also provide a helical track that is much easier to make and assemble than the prior art metal tracks. The conveyor/accumulator would be designed for long service life with minimal maintenance requirements.

SUMMARY OF THE INVENTION

Accordingly, it is a primary object of the present invention to provide a helical conveyor/accumulator that is adapted to efficiently elevate and lower articles from one level to another within a compact space.

It is another object of the present invention to provide a helical conveyor/accumulator that allows articles to accumulate for temporary storage during extended production line downtime.

It is still another object of the present invention to provide a helical conveyor/accumulator that allows the vertical transport along substantially frictionless surfaces to minimize the chance for article damage.

It is an additional object of the present invention to provide a helical conveyor/accumulator that uses a side flexing track to facilitate ease in manufacture and assembly.

Still another object of the present invention is to provide a helical conveyor/accumulator that allows a metered discharge of articles that are released from accumulation.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention, as described herein, an improved helical conveyor/accumulator is provided allowing articles to be transported in a vertical direction within a compact space. Also, articles may be accumulated, such as for temporary storage in case of emergency production line downtime or sluggish downstream processing. The articles remain separated during conveyance; i.e. they are not allowed to overrun one another, thus substantially preventing damage when precision parts are being handled.

The helical conveyor/accumulator includes a cylindrical drum that is mounted for rotation and driven by a vertical drive shaft that extends along its central axis. The drum includes a plurality of longitudinal inserts providing grooves or slots, defined by spaced side ribs, that extend along its entire length. The grooves are adapted to receive articles for conveyance, as will be further described below. The grooves may be designed to accommodate articles such as bearings, as well as other articles having a variety of shapes and sizes. Accordingly, the grooves may be wide or narrow, shallow or deep, or have differently shaped contact surfaces.

A stationary track for supporting the articles is disposed around the rotary drum. The track is mounted in a helical pattern around the drum, substantially along its entire length. The inner edge of the track is positioned adjacent the drum so that articles are completely supported by the track while engaging the outer periphery of the drum. In operation, as the drum rotates with the articles seated within the grooves, the articles are carried vertically along the grooves while sliding along the helical track.

In an important aspect of the invention, the track has a side flexing character. More particularly, the track is formed from interconnected modular links made of high density plastic. This eliminates the need, as with a solid metallic structure, to bend the track components to be rigidly and precisely pitched, and also provides a surface that facilitates damage-free conveyance. The side flexing track can also adapt to a number of pitch dispositions within design parameters. Additionally, the track is inclined, slanting from its outer edge to its inner edge. Thus, any article laid freely on the surface slides towards the drum by the force of gravity. This facilitates engagement between the articles and the receiving groove on the drum.

The helical conveyor/accumulator is supported within a frame including vertical columns connected by beams at the top and bottom. Each column is in turn supported by a support foot that is vertically adjustable to assist in level positioning.

The structure of the modular links in conjunction with the interconnection of adjacent links provides for the advantageous side flexing character of the track. More particularly, the inner edges of the links adjacent the drum are allowed to gather upon themselves while the outer edges are allowed to expand apart to their greatest extent. Such a link design is particularly suited for traveling around curves or bends. It can be appreciated that the helical disposition of the track around the cylindrical drum represents a continuous bend. Reference is made to co-pending U.S. patent application Ser. No. 07/456,390 now U.S. Pat. No. 5,031,757, entitled "Modular Link Conveyor System with Narrow Chain", assigned to the assignee of the present invention, wherein is particularly described the structure of the links and their interconnecting design.

The modular link track is supported around the drum by a pair of helical coils. The coils are preferably fabricated of a resilient metallic rod. One coil is relatively tightly wound so as to have an unstressed diameter that is just slightly greater than the outer diameter of the rotary drum. This inner coil fits around the drum in a sleeve-like manner. The other or outer coil is less tightly wound and has an unstressed diameter that is slightly less than the diameter of the outer edge of the track.

The coils engage a depending arm of the respective modular link to help support the track in its helical pattern around the drum. More particularly, the inner coil engages the inner depending arm on the innermost transverse link. The outer coil engages the outer depending arm on the outermost transverse link. Because of the relative sizes described above, each coil is spring-loaded to be urged against its adjacent depending arm and locks in place. Thus the track is held in a taut, helically guided manner around the drum.

The track is further supported within the frame structure with the use of spaced lateral support rods. The support rods may be elongated versions or extensions of the transverse cross rods utilized to couple the links together. The support rods lock within the inner depending arm exactly as with the cross rods. However, the support rods extend past the outer edge of the outermost link and are clamped to the frame column. Each clamp includes a mating slot for receiving the support rod. The clamp is adjustably attached to the frame column to hold the support rod, and thus the track, to the frame. If desired, separate spacer blocks for adjacent turns of the track can also be employed at the point of engagement of the support rods with the track.

A standard motor is used to rotate &he drum. The motor operates through a variable speed gear box. Thus, the drum rotates continuously at the selected speed in response to motor operation.

The helical conveyor/accumulator operates with essentially maintenance-free efficiency in transporting articles elevationally within a compact space. Articles are delivered by an infeed chute to the helical conveyor track. The inclined disposition of the track directs the articles towards the drum. The article remains substantially stationary against the surface of the rotating drum until the article comes in contact with the next longitudinal insert. The article seats within the groove of the insert and as the drum rotates, the article slides along the groove in either an upward or downward direction depending on the particular operation as it slides on the track. When the article reaches the outfeed end of the track during continuous conveyance, it is released by a wiper and transferred to a discharge conveyor.

The helical conveyor/accumulator operates in a similar manner when utilizing its accumulation function. A stopping device such as a cut-off gate, is positioned near the outfeed end of the track. When the gate is closed, an article that is being carried along the longitudinal groove while sliding on the helical track contacts and is stopped. As the drum continues to rotate the next succeeding article is carried into abutting relation with the article engaging the gate. This process continues as the drum rotates so as to accumulate articles extending back from the gate on the conveyor track. It can be appreciated that the substantially frictionless nature of the contact surfaces of the conveyor/accumulator allows the articles to safely accumulate, even as the grooves pass along the accumulation line. The articles tend to lift but remain in substantially stationary position as the grooves slip past.

When it is desired to release the articles from accumulation, the conveyor/accumulator allows for a metered discharge. More particularly, when the gate is opened, the lead article slides down against the drum and is engaged by and seats within the next longitudinal groove. This article is then carried up to and released to the discharge or take-away conveyor in the desired controlled succession. The next succeeding groove picks up the next succeeding article, and the process continuous as the drum rotates. Accordingly, it can be appreciated that the controlled or metered discharge is accomplished without additional mechanical or electrical components. Also, the metered discharge is a function of the speed of rotation of the drum. By simply adding additional inserts, an increase in article discharge frequency is attained.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 3A is a partial view taken along lines 3A—3A of FIG. 2, showing spaced article feed from an infeed chute onto the helical track;

FIG. 3B is a partial view taken along lines 3B—3B of FIG. 2, showing articles in abutting relation during a dual feed/accumulate mode;

FIG. 3C is a partial view taken along lines 3C—3C of FIG. 2, showing articles accumulating for temporary storage near the discharge conveyor;

FIG. 4 is a close-up partially broken away view of a portion of the helical conveyor/accumulator showing the helical track supporting bearings for conveyance and with the support rods and the guide coils providing their cooperative functions;

FIG. 6 is a partial top plan view showing the cooperative relationship of the drum, track, support coils and support rods of the conveyor/accumulator and particularly showing the side flexing nature of adjacent links utilized to form the conveyor/accumulator track.

Reference will now be made in detail to the present preferred embodiment of the invention, an example of which is illustrated in the accompanying drawing.

DETAILED DESCRIPTION OF THE INVENTION

Figure 1:
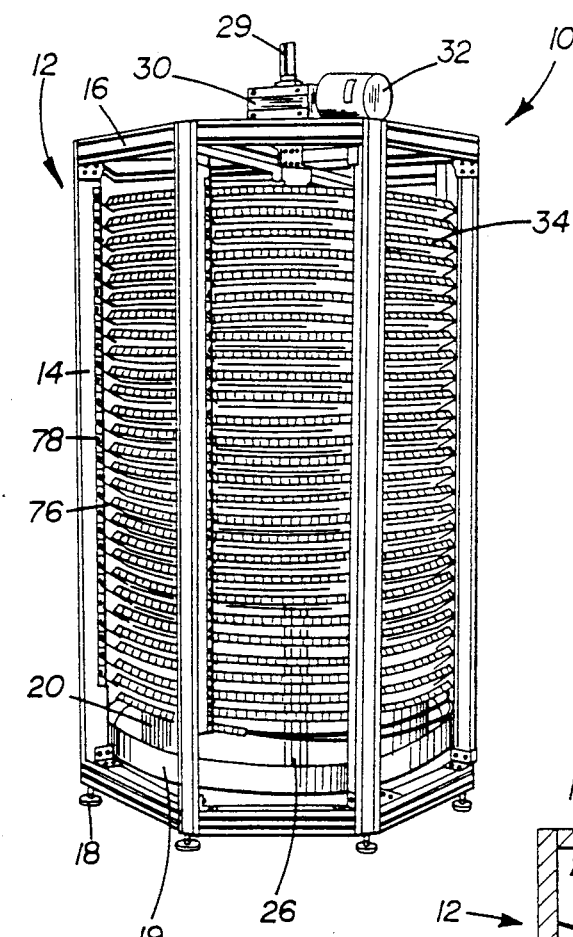
FIG. 1 is a side elevational view of the helical conveyor/accumulator of the present invention.
Figure 2:
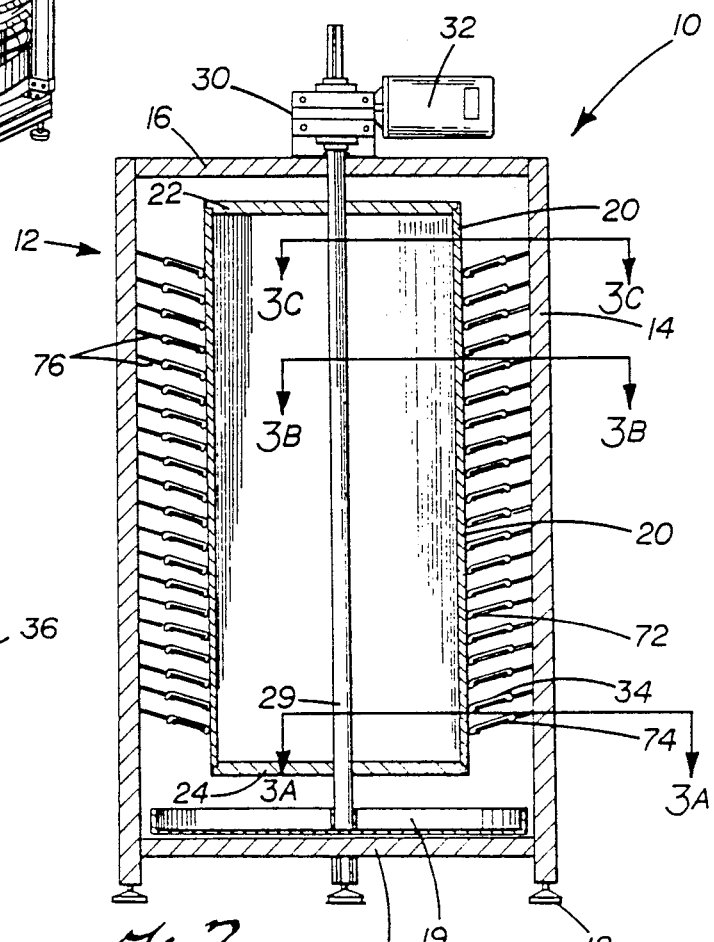
FIG. 2 is a side elevational view in cross section of the helical conveyor/accumulator of the present invention.

Reference is made to the drawing and in particular to FIGS. 1 and 2 wherein is shown a helical conveyor/accumulator 10 according to the teachings of the present invention. The conveyor/accumulator 10 performs the dual function of vertically conveying articles in a compact space and, when desired, allowing articles to accumulate on the conveyor/accumulator track to accommodate downstream downtime or differences in processing speed.

The helical conveyor/accumulator 10 includes a frame 12 that defines a vertical envelope. Thus, when floor space in a manufacturing facility is limited, articles may be efficiently transferred from one elevational level to another within the envelope/space defined by the periphery of the frame 12.

The frame 12 includes a plurality of columns 14 connected by beams 16 at the bottom and the top of the frame 12. The columns 14 are generally equally angularly spaced about the periphery of the conveyor/accumulator 10 and equally radially spaced from its central axis. A support foot 18 is attached at the bottom of each column 14 to support the frame on the floor of a manufacturing facility. Advantageously, the support feet 18 are vertically adjustable to ensure level positioning of the conveyor/accumulator 10. A drip pan 19 is provided to catch any oil or other liquid that drops from the articles being conveyed.

Centrally disposed within the frame 12 is a cylindrical drum 20 including a top mounting plate 22 and a bottom mounting plate 24 that encloses a hollow interior. The drum is preferably formed of high density polyethylene to provide a relatively frictionless peripheral surface. The drum 20 is formed with a plurality of recessed or open areas on its outer surface. Inserts 26 made of high density plastic material, also such as polyethylene, are secured in these recessed areas.

Figure 5:
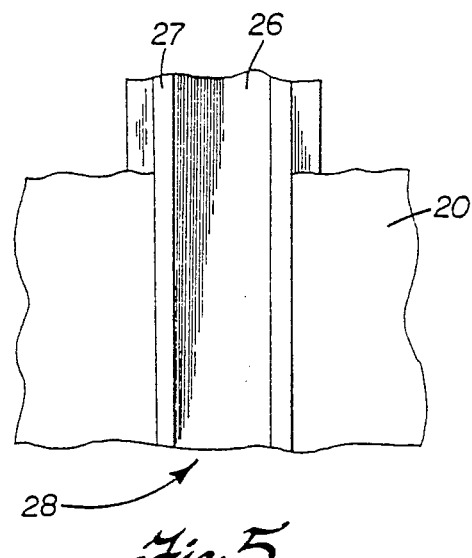
FIG. 5 is a close-up broken away front view of the groove formed by the ribbed insert in the drum of the helical conveyor/accumulator.

In an important aspect of the invention, the inserts 26 are formed with article engaging elements, such as the longitudinal ribs 27 shown best in FIGS. 5 and 6. The inserts 26 with the ribs 27 define article receiving grooves, generally designated as 28, longitudinally disposed on the periphery of the drum 20. The drum may be manufactured with any number of grooves 28, as the application including the feed frequency requires. Additionally, the grooves 28 may be formulated so as to have receiving surfaces that accommodate specific articles, such as roller bearings $A-A_n$ (see FIGS. 3A-3C). Of course, other articles that have differing shapes can be easily made to work. The use of plastic material provides a relatively friction-free surface in which the articles are carried to assist in efficient conveyance.

The grooves 28 are specifically designed to accommodate both the conveyance and accumulation functions of the conveyor/accumulator 10. More specifically, the ribs 27 provide positive contact to generate a sufficient propelling force to carry the received article A along the groove 28 while allowing the article to become disengaged from the groove when the conveyor/accumulator 10 is in a storage/accumulation mode (see FIG. 3C and as will be more completely detailed below). It can be appreciated that the inventive groove design significantly differs from prior art designs where the grooves contact substantially one-half of the article and thus prevent the possibility of a storage/accumulation mode. The drum 20 is mounted for rotation within the frame 12. More particularly, a drive shaft 29 extends through the central axis of the drum 20. The drive shaft 29 is keyed to a gear box 30 supported on the cross beams 16 at the top of the frame support 12. The gear box 30 is connected to a motor 32 that provides the driving force for rotation of the drum 20. Thus, when the motor 32 is energized, the drive shaft 29 is driven for continuous rotation through the gear box 30.

A stationary track 34 forming a support surface for conveyed articles $A-A_n$ is disposed between the frame 12 and the drum 20. The track 34 is helically wound around the drum 20 preferably extending at a pitch of approximately 2 inches-5 inches per 360° turn. Advantageously, the track 34 forming the conveyor surface is inclined so that it slants downwardly from its outer edge to its inner edge (towards the drum 20). In the preferred embodiment shown adapted to convey/accumulate bearings, an inclination of approximately 20° is selected. Accordingly, any article $A-A_n$ placed on the track 34 slides towards the drum 20 due to the force of gravity. This particularly directs the articles to a position whereby engagement with the grooves 28 on the rotary drum 20 is effected. The articles seat within the grooves 28 and are conveyed by the trailing rib 27 so as to be carried elevationally along the groove while sliding on the track 34 as the drum 20 rotates.

In a very important aspect of the invention, the track 34 is formed by a plurality of interconnected integral modular links 36. In the preferred embodiment, the links 36 are fabricated from high density plastic, also preferably polyethylene. Thus, the links are non-corrosive, durable, and allow drainage of any liquid on the articles, and can be easily cleaned due to the open design. In addition, the plastic material provides a relatively frictionless surface on which conveyed articles are supported for sliding.

The particular design of the links 36 and their interconnection provide a side flexing character to the track 34. This is particularly beneficial for assembly and use of the track 34 to the helical pattern.

A set of adjacent links 36 is shown in FIG. 6, particularly indicating the side flexing character of the track 34. The design of the links 36 themselves and the cooperative interconnection of adjacent links allows the inner edges of the links to gather upon themselves and the outer edges of the links to expand apart to their greatest extent as the track 34 curves around the drum 20. The track 34 may be formed with one or more transverse rows of links, depending on the particular working requirements (see FIG. 4 where is shown a double wide belt, i.e. two rows of links 36 positioned side-by-side).

As best shown in FIG. 6, each link 36 includes a plurality of apex portions 38 and a plurality of leg portions 40 extending at an angle. The leg portions 40 extending from the center apex portions 38 converge toward the closest leg portion 40 of the adjacent apex portions 38 to form a common foot portion 42. The inner facing surfaces 44 of the foot portions 42 are slanted to assist in the helical positioning of the track 34 as it winds around the drum 20. The inner facing surfaces 44 cooperate with the bulb-like surfaces 46 of the center apex portions 38 to maintain relative close transverse alignment of adjacent links 36. The modular links 36 also include a pair of side portions 48 that cooperate with other structures associated with the positioning of the track 34, as will be more fully described below.

Figure 7:
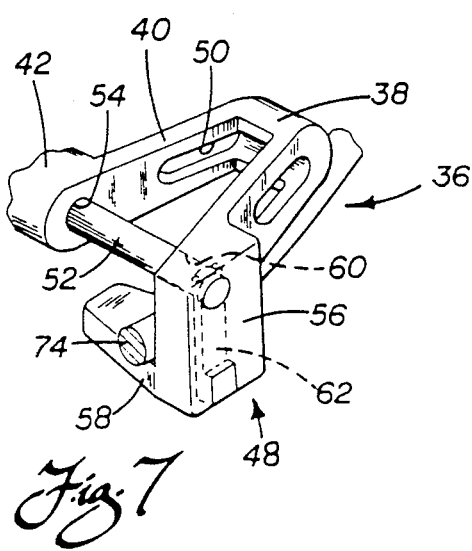
FIG. 7 is a perspective view of a side modular link utilized to form the conveyor/accumulator track.

As best shown in FIG. 7, there is provided an elongated slot 50 extending from the apex portion 38 down the leg portion 40 to substantially near the foot portion 42 associated with each link 36. The slot 50 receives a transverse cross rod 52 that is provided to interconnect adjacent links 36. The elongated nature of the slot 50 allows the required degree of longitudinal freedom of movement to the rod 52. This in turn allows a similar degree of longitudinal freedom of movement to the entire track 34. This advantageously assists the side flexing ability of the track 34 for forming its helical disposition around the drum 20. In effect, the positioning is infinitely adjustable between a maximum curve and straight, so that custom tracks can be made utilizing the same component parts.

The foot portions 42 of the links 36 include a transverse hole 54 for receiving the cross rod 52 (see FIG. 7). Thus, it can be appreciated that the cross rods 52 join the foot portions 42 of one link 36 with the apex portions 38 of the next adjacent link 36, thereby forming the interlocking track 34. As the track 34 extends helically around the drum 20, the longitudinal freedom provided by the slots 50 allows the rods 52 to adjust freely, giving the track 34 through its links 36 the beneficial side flexing character. Thus, it should be appreciated that the slots 50 and the slanted, cooperating facing surfaces 44, 46 operate together to allow the rods 52 to pivot linearly around the curves of the drum 20 with substantially even loading on the individual links 36. As also shown in FIG. 7, the side portions 48 include a depending arm 56 for engaging a cooperating support coil, which will be more fully described below. In addition, the side portions 48 assist in maintaining the cross rods 52 within the track 34. A transversely extending tab 58 is provided on the depending arm 56 to capture the support coil. The depending arm 56 further includes a hole 60 extending therethrough that is co-axial with the holes 54 of the foot portions 42. The hole 60 receives the cross rod 52, and retains it through the use of a locking tab 62 (see FIG. 7).

The track 34 is thus guided and supported between the drum 20 and frame 12 by the cooperation of a pair of guide coils 72, 74; the inner coil 72 positioned in close proximity to the drum 20 and the outer coil 74 positioned adjacent the frame 12. The coils 72, 74 engage the corresponding side portions 48 of the links 36.

In constructing the conveyor/accumulator 10, the inner coil 72 is spring loaded with a compressing force so that it tends to contract inwardly towards the drum 20. This compressing force allows for secure engagement between the coil 72 and the depending arm 56 on the innermost side portion 48 of the innermost link 36 (see FIG. 6). The sleeve-like adjacency of the inner guide coil 72 and the drum 20 assures that the track 34 is supported in juxtaposition with the drum. Thus the articles $A-A_n$ are completely supported by the track 34 while engaging the drum 20 with light pressure due to the gravitational force. The outer coil 74 is supplied with tension so that it tends to expand outwardly towards the frame 12. Thus, this tensioning force provides secure engagement between the coil 74 and the depending arm 56 of the outermost side portion 48 of the outermost link 36.

The track 34 is peripherally supported by the frame 12 with the use of extended support rods 76 substituted for the cross rods 52 at positions near the frame columns 14 (see FIG. 6). These rods act to both interconnect the modular links 36 as well as vertically position the track 34. Each support rod 76 is locked within the depending arm 56 of the innermost link 36, just as are the cross rods 52 (see FIG. 7).

As best shown in FIGS. 4 and 6, the rod 76 is received in a slot 80 in the L-shaped, reversible clamp 78. The slot 80 opens to the inside surface of the clamp 78. Thus, when the clamp 78 is secured to the column 14 as through the tightening of a screw 82, the support rod 76 is held firmly in place against the column 14. The columns 14 are provided with grooves 84 to receive a guide rib (see FIG. 6). By sliding the clamps 78 along the groove 84, the height of the turns of the track 34 can be adjusted.

The two important functions of the conveyor/accumulator 10 are shown in FIGS. 3A-3C. It can be appreciated, of course, that the conveying action may be reversed so as to transport articles from a higher elevational position to a lower elevational position.

As shown in FIG. 3A, as each article A reaches the end of the sloped infeed chute 88, it slides onto the track 34 of the conveyor/ accumulator 10. Due to the inclined nature of the track 34, each article A, slides towards the drum 20. For the particular elevating action herein shown, the drum is rotating in a counter-clockwise direction, as is generally indicated by action arrows X.

As indicated above, the surface of the drum 20 is substantially friction-free. Accordingly, as an article $A_1$ rests on the track 34 against the drum 20, it remains essentially stationary as it maintains contact with the surface of the drum. As a longitudinal groove 28 rotates into engagement with the arcial (note article $A_2$), the article seats within the groove and maintains positive contact with the ribs 27. As the drum 20 rotates, each article is carried along the groove 28 by the propelling contact of the trailing rib 27 while sliding upwardly along the helical track 34. The motion of each higher article $A_n$, as it is moved by the conveyor/accumulator 10, is indicated.

As the article A approaches the desired outfeed elevational level, the track 34 ends and the articles $A_n$ engage a wedge shaped wiper 89 so as to be lifted from the track 34 and directed to discharge conveyor 90 (see FIG. 3C). The articles are then transported to downstream stations for further processing.

The conveyor/accumulator 10 thus provides a spaced helical article feed and storage arrangement from the infeed chute 88 to the discharge conveyor 90, as shown in FIGS. 3A-3C. In normal operation, the accumulation function creates a back-up of articles that extends from the discharge area (FIG. 3C) back towards a mid-elevational level on the conveyor/accumulator 10, as illustrated in FIG. 3B. This mid-section of the conveyor/accumulator acts essentially in a dual feed/accumulate mode. The articles reach a position where abutting relation starts. Certain articles, such as articles $A_3$, are maintained in the seated position within the corresponding grooves 28 formed by the ribbed inserts 26 so long as the flow of articles $A_4$-$A_n$ toward the discharge end (FIG. 3C) is not stopped. The positive contact between the articles $A_3$ and the trailing ribs 27 in combination with the rotation of the drum 20 provides the propulsion for the articles $A_3$, $A_4$-$A_n$ and on up the track 34.

The seated articles $A_3$ act as pushers for the next-in-line articles $A_4$-$A_n$ to continue propelling the entire accumulation line along the path toward the discharge conveyor 90. The substantially frictionless surfaces provided by the drum 20 and the track 34 allow the pushed articles $A_4$-$A_n$ to freely travel up the feed path defined by the track.

To establish the full accumulation function, a stop gate 92 is closed (see FIG. 3C) in response to control actuator 94. As the articles $A_n$ are carried up the track 34, the leading article $A_x$ reaching the closed gate 92 is stopped. The next successive articles $A_n$ are then forced with increasing pressure against each other. This procedure is continuous as long as the gate 92 is closed. The side-to-side pressure of abutting articles $A_n$ creates an outward or radial force (see action arrows in FIG. 3C) away from the surface of the drum 20, providing sufficient spacing to allow the ribbed inserts 26 to rotate past the accumulation line with little or no contact. Even with minimal contact, the articles simply intermittently lift away from the drum 20 and allow the groove 28 to slip past (see articles $A_n$ in FIG. 3C). Each of the inserts 26 moves past the accumulated articles $A_n$ without forcing them any further outwardly that could disrupt the line. This action provides a built in safeguard against pushing the articles over the outer edge of the track 34. Thus the articles maintain an essentially stationary and orderly position along the accumulation line.

When it is desired to reestablish the delivery of articles $A_n$ from accumulation, the gate 92 is opened. The accumulated articles $A_x$-$A_n$ are then released one-at-a-time in controlled succession. To explain, since the articles in the released accumulation line resting on the track 34 are generally slightly spaced from the rotating drum 20 due to the side-to-side pressure of the abutting relationship, the articles are initially substantially stationary. However, with the pressure released on the leading side, the first article $A_x$ slides back to the peripheral surface of the drum 20; i.e. when the forward side pressure exerted by the gate 92 is released the article $A_x$ can now seat in the next in line longitudinal groove 28. Accordingly, each article $A_x$-$A_n$ in the accumulation line is in turn picked up by succeeding inserts 26 to be carried in timed succession to the discharge conveyor 90. Thus, the discharge of articles A from accumulation is with the articles spaced apart the exact distance between the inserts 26.

In summary, numerous benefits are obtained by the use of the conveyor/accumulator 10 of the present invention acting to both convey articles $A_n$ between different elevational levels within a compact space and, when conditions require, allowing articles to be accumulated. The side flexing character of the track 34 allows easy adaptability and assembly for helical disposition around the rotary drum 20. The longitudinal grooves 28 formed by the ribbed inserts 26 on the drum 20 provide receptor grooves or slots for articles, so that as the drum rotates, the articles are carried up (or down) the track with sliding action.

The substantially frictionless contact surfaces offered by the drum 20, track 34 and the inserts 26 provide for efficient conveyance, allowing long term operation with minimal maintenance. The article engaging ribs 27 provide sufficient contact with the articles to provide article movement during the conveyance mode, but at the same time allowing free release of the article substantially during the accumulation mode. Operation of the gate 92 allows articles $A_n$ being transported on the conveyor/accumulator 10 to be accumulated in an orderly manner and then later released for metered discharge.

The foregoing description of a preferred embodiment of the invention has been presented for purposes of illustration and description. It is not intended to exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A helical conveyor/accumulator for moving articles along a path between different elevational positions comprising:
   frame means;
   drum means mounted for rotation about a central axis on said frame means;
   side flexing track means helically disposed around said drum means; groove means longitudinally disposed on the outer periphery of said drum means for receiving said articles; and
   drive means for imparting motion to said drum means,
   whereby said articles are carried vertically along said groove means while sliding along said track means as said drum means rotates.

2. The helical conveyor/accumulator as in claim 1, wherein said drum means, said track means and said groove means are formed of low-friction material.

3. The helical conveyor/accumulator as in claim 2, further including stop means at the discharge end of said track means for stopping the forward motion of said articles in order to allow accumulation.

4. The helical conveyor/accumulator as in claim 3, further including means to selectively actuate said stop means.

5. The helical conveyor/accumulator as in claim 1, wherein said track means is radially inwardly inclined.

6. The helical conveyor/accumulator as in claim 1, wherein is provided coil means for supporting said track means including an inner coil wound adjacent said drum means and engaging an inner edge of said track means and an outer coil engaging an outer edge of said track means.

7. The helical conveyor/accumulator as in claim 1, wherein said side flexing track means includes a plurality of modular links.

8. The helical conveyor/accumulator as in claim 7, wherein each of said modular links includes a plurality of apexes and a plurality of legs extending therefrom, each of said apexes further including a slot passing transversely therethrough, said legs further terminating in a distal end portion, each said end portion including a hole passing transversely therethrough.

9. The helical conveyor/accumulator as in claim 8, further including connecting rods transversely passing through said slots and said holes to engage said modular links together to form said track means.

10. The helical conveyor/accumulator as in claim 9, further including support rods in place of said connecting rods and coupled to said frame means to support said track means.

11. The helical conveyor/accumulator as in claim 10, further including clamp means to attach said support rods to said frame means.

12. A helical conveyor/accumulator for moving articles along a path between different elevational positions comprising:
   frame means;
   drum means mounted on said frame means for rotation about a central axis;
   track means helically disposed around said drum means;
   groove means longitudinally disposed on the outer periphery of said drum means for receiving said articles, said groove means including ribs for engaging said articles so as to generate a force sufficient for conveying said articles while allowing free release of said articles from said groove means upon accumulation of said articles; and
   drive means for imparting continuous motion to said drum means,
   whereby said articles are carried along a helical path by said groove means while sliding along said track means as said drum means rotates.

13. The helical conveyor/accumulator as in claim 12, wherein said track means and said groove means are formed of low-friction material.

14. The helical conveyor/accumulator as in claim 13, wherein said low friction material is high density polyethylene.

15. The helical conveyor/accumulator as in claim 14, wherein said track means is radially inwardly inclined.

16. The helical conveyor/accumulator as in claim 15, wherein the inclination of said track means is approximately 20°.

17. The helical conveyor/accumulator as in claim 12 wherein said track means is of a side flexing character.

* * * * *